United States Patent [19]

Abramovitz et al.

[11] Patent Number: 4,637,688

[45] Date of Patent: Jan. 20, 1987

[54] ACOUSTO-OPTIC DIFFRACTION AND SIGNAL MIXING DEVICE

[75] Inventors: Irwin J. Abramovitz; Norman J. Berg, both of Baltimore, Md.; Michael W. Casseday, Washington, D.C.

[73] Assignee: The United States of America as represented by the Secretary of the Army, Washington, D.C.

[21] Appl. No.: 599,309

[22] Filed: Apr. 12, 1984

[51] Int. Cl.⁴ .................................................. G02F 1/33
[52] U.S. Cl. ..................................................... 350/358
[58] Field of Search ....................... 350/358, 371, 373; 364/822

[56] References Cited

U.S. PATENT DOCUMENTS

| | | | |
|---|---|---|---|
| 4,110,016 | 8/1978 | Berg et al. | 350/358 |
| 4,124,280 | 11/1978 | Berg et al. | 350/358 |
| 4,124,281 | 11/1978 | Berg et al. | 350/358 |
| 4,139,277 | 2/1979 | Berg et al. | 350/358 |
| 4,326,778 | 4/1982 | Berg et al. | 350/358 |
| 4,421,388 | 12/1983 | Berg et al. | 350/358 |
| 4,426,134 | 1/1984 | Abramovitz et al. | 350/358 |

OTHER PUBLICATIONS

Berg et al., "A New Single AO Element Two-Dimensional Signal Processor", paper presented at the IEEE Ultrasonics Symposium, Atlanta, Georgia, 11-2-83.

Primary Examiner—William H. Punter
Attorney, Agent, or Firm—Saul Elbaum; Harry Lupuloff; Anthony T. Lane

[57] ABSTRACT

An acousto-optic diffraction and signal mixing device. A laser light beam is expanded and shaped into a sheet beam which is directed across the surface of an acousto-optic medium. Four acoustic transducers are disposed on the acousto-optic medium, two at each end of the medium. Each acoustic transducer is supplied with a signal to be propagated on the surface of the acousto-optic medium. The first two signals diffract the sheet beam to produce a first product diffracted beam of light containing the product of the first two signals. The second two signals diffract the sheet beam to produce a second product diffracted beam of light containing the product of the second two signals.

6 Claims, 4 Drawing Figures

ACOUSTO-OPTIC DIFFRACTION AND SIGNAL MIXING DEVICE

RIGHTS OF THE GOVERNMENT

The invention described herein may be manufactured, used or licensed by or for the Government of the United States of America for governmental purposes without payment to us of any royalties hereon.

CROSS REFERENCE RELATED APPLICATIONS

Reference is made to an application entitled "Multi-Product Acousto-Optic Time Integrating Correlator," Ser. No. 599,365 filed by the same inventors on even date as this application.

BACKGROUND OF THE INVENTION

This invention relates to surface acoustic wave (SAW) delay line devices.

In the present invention, the acoustic anistropy properties of lithium niobate ($LiNbO_3$) was employed to isolate co-propagating acoustic wave whose propagation vectors was shifted by approximately 4 degrees. In this manner, the two SAW devices required by the previous architectures are replaced by one.

SUMMARY OF THE INVENTION

Lineraly polarized HeNe laser radiation is imaged onto y-cut, z-propagating lithium niobate surface acoustic wave delay line. The transducer geometry on the lithium niobate surface acoustic wave line is such that the four transducers lie in the x-y plane, each rotated by twice the Bragg angle ($2\theta_B$) from the x-axis. One set of transducers is rotated by $+2\theta_B$ from the x-axis, the other is rotated by $-2\theta_B$ from the x-axis. These acoustic transducers launch Rayleigh waves which generate phase gratings in the interaction region.

The present invention provides an acousto-optic apparatus for providing the products of a first signal with a second signal, and a third signal with a fourth signal. A laser beam is expanded and formed into a sheet beam. An acousto-optic medium having an axis and a planar surface extending between opposite first and second ends is disposed in the path of the sheet beam so that the sheet beam traverses the medium between the medium ends along and parallel to the medium suface. First and third acoustic transducers are disposed at the first end of the acousto-optic medium for propagating the first and third signals on the medium surface in the direction of the second end of the acousto-optic medium. Second and fourth acoustic transducers are disposed at the second end of the acousto-optic medium for propagating the second and fourth signals on the medium in the direction of the first end of the acousto-optic medium. The first and second signals diffract the sheet beam to produce a first beam containing the product of the first signal with the second signal. The third and fourth signals diffract the sheet beam to produce a second beam containing the product of the third signal with the fourth signal.

The acousto-optic medium has an axis which extends between the first and sedond ends of the medium. This axis is defined to be the z-axis. The axis normal to the surface of the acousto-optic medium is defined to be the y-axis, and the axis normal to both the z-axis and the y-axis is defined to be the x-axis. In the preferred embodiment of the device, the first acoustic transducer is disposed at the first end of the medium at an angle relative to the x-axis which is equal to $+2\theta_B$, and the second acoustic transducer is disposed at the second end of the medium at angle relative x-axis which is also equal to $+2\theta_B$. The third acoustic transducer is disposed at the first end of the medium at an angle relative to the x-axis which is equal to $-2\theta_B$, and the fourth acoustic transducer is disposed at the second end of the medium at an angle relative to the x-axis which is also equal to $-2\theta_B$. In each instance, $\theta_B$ is the Bragg angle of the acousto-optic medium, which is Y-Z lithium niobate, for the average of the acoustic frequencies being propagated.

The present invention also provides a method for providing the products of the first signal with the second signal, and the third signal with a fourth signal. A laser beam is expanded and formed into a sheet beam. The sheet beam is directed to an acousto-optic medium having an axis and a planer surface extending between opposite first and second ends so that the sheet beam traverses the medium between the medium ends along and parallel to the medium. A first signal is propagated on the planar surface of the acousto-optic medium toward the second end of the acousto-optic medium. A second signal is propagated on the planar surface of the acousto-optic medium toward the first end of the acousto-optic medium. A third signal is propagated on the planar surface of the acousto-optic medium toward the second end of the acousto-optic medium. A fourth signal is propagated on the planar surface of the acousto-optic medium toward the first end of the acousto-optic medium. The first and second signals diffract the sheet beam to produce a first beam containing the product of the first signal with the second signal; and the third and fourth signals diffract the sheet beam to produce a second beam containing the product of the third signal with a fourth signal.

Also provided by the present invention is an acousto-optic apparatus for producing at least two diffracted optical signals from a single, undiffracted optical signal. The laser beam is expanded and formed into a sheet beam. An acousto-optic medium having an axis and a planar surface extending between opposite first and second ends is disposed in the path of the sheet beam such that the sheet beam traverses the medium ends along and parallel to the medium surface. The first acoustic transducer is disposed at the first end of the acousto-optic medium and supplied with a first signal, for propagating the first signal on the medium surface in the direction of the second end of the acousto-optic medium. The second acoustic transducer is disposed at the second end of the acousto-optic medium and supplied with a second signal, for propagating the second signal on the medium surface in the direction of the first end of the acousto-optic medium. A third acoustic transducer is disposed at the first end of acousto-optic medium and supplied with a third signal, for propagating the third signal on the medium surface in the direction of the second end of the acousto-optic medium. A fourth acoustic transducer is disposed at the second end of the acousto-optic medium and is supplied with the fourth signal for propagating the fourth signal on the medium surface in the direction of the first end of the acousto-optic medium. The first and second signals diffract the single undiffracted optical signal to produce a first product diffracted optical signal. The third and fourth signals diffract the single undiffracted optical signal to produce a second product diffracted optical signal. In this device, the acousto-optic medium comprises a surface acoustic wave device built on Y-Z lithium niobate.

OBJECTS OF THE INVENTION

It is an object of this invention to provide an acousto-optic medium with four transducers disposed thereon.

It is another object of this invention to present an acousto-optic apparatus and method for providing products of a first signal with a second signal and a third signal with a fourth signal.

It is a further object of this invention to present an acousto-optic apparatus for producing at least two diffracted optical signals from a single, undiffracted optical signal.

DESCRIPTION OF THE PREFERRED EMBODIMENT

Figure 1:
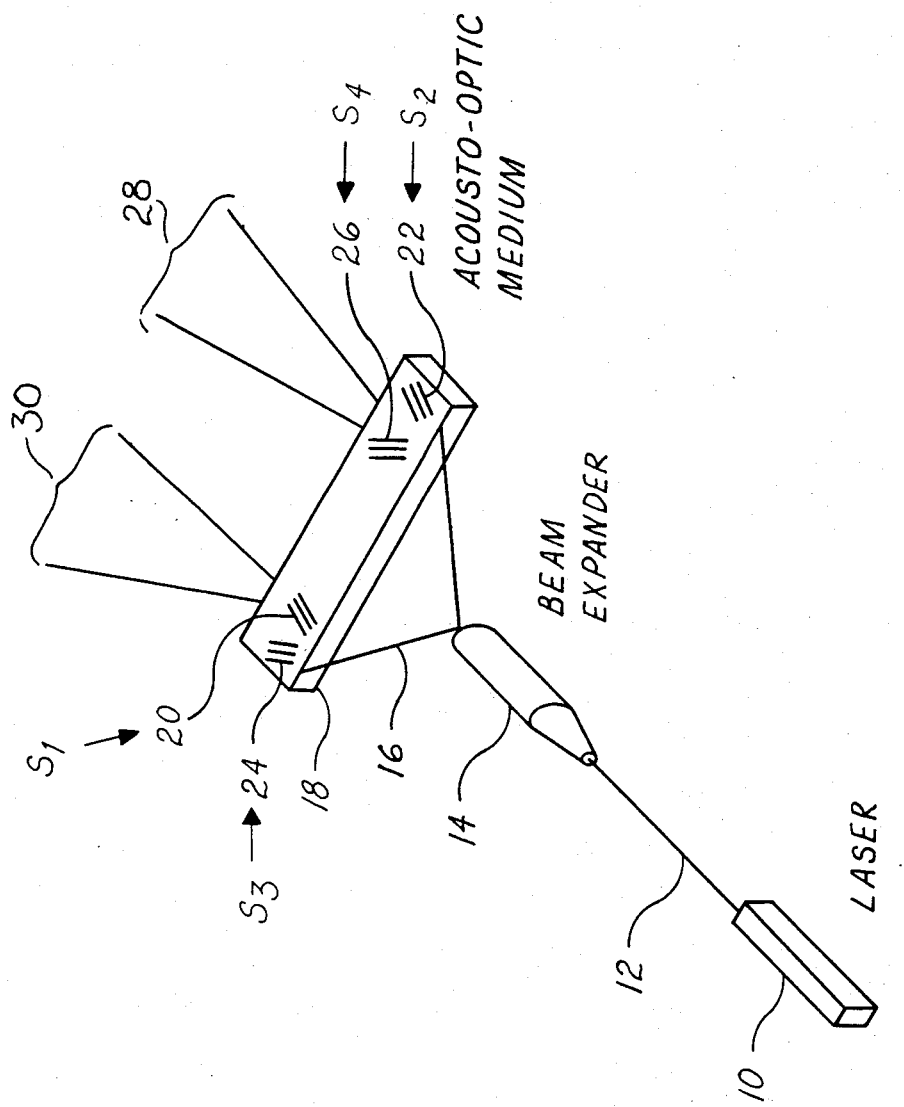
FIG. 1 is a schematic of the acousto-optic diffraction and signal mixing device.

Referring now to the drawings, FIG. 1 is a schematic of the acousto-optic diffraction and signal mixing device. A laser 10 generates a single undiffracted laser beam 12. Laser beam 12 is expanded by beam expander 14 into a collimated sheet beam 16. The sheet beam 16 is directed across the surface of an acousto-optic medium 18. Acousto-optic medium 18 has acoustic transducers 20 and 24 disposed on the surface thereof at its first end; and acoustic transducers 22 and 26 disposed on the surface therof at its second end. Signals $S_1$ and $S_3$ are supplied to acoustic transducers 20 and 24, respectively, for propagating them on the surface of the acousto-optic medium 18 in the direction of the second end of the acousto-optic medium. Signal $S_2$ and $S_4$ are supplied to acoustic transducers 22 and 26, respectively, for propagating them on the surface of the acousto-optic medium 18 in the direction of the first end of the acousto-optic medium. Signals $S_1$ and $S_2$ interact with the sheet beam 16 producing a first product diffracted beam 28 containing the product of $S_1$ with $S_2$. The signals $S_3$ and $S_4$ interact with sheet beam 16 producing a second product diffracted beam 30 containing the products of $S_3$ with $S_4$.

Figure 2:
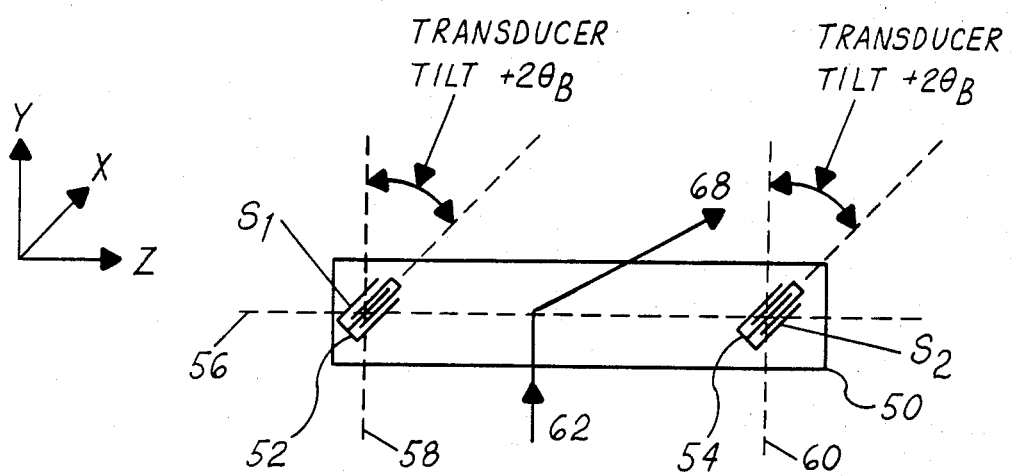
FIG. 2 illustrates an acousto-optic medium with two acoustic transducers disposed thereon.

Referring now to FIG. 2, there is shown an acousto-optic medium 50 with two acoustic transducers 52 and 54 disposed thereon. The acoustic transducer 52 is tilted with respect to the axis 58 by an angle $+2\theta_B$, where $\theta_B$ is the Bragg angle in the acousto-optic medium. The acoustic transducer 54 is tilted with respect to the axis 60 by an angle $+2\theta_B$, where $\theta_B$ is the Bragg angle in the acousto-optic medium. In the drawing, axis 56 represents the z-axis, and axes 58 and 60 represent the x-axis. The signal $S_1$ is supplied to acoustic transducer 52 causing the signal to propagate towards the opposite end of the medium. The signal $S_2$ is supplied to acoustic transducer 54 causing the signal to propagate towards the opposite end of the medium. Product diffracted beam 68 diffracted from incoming sheet beam 62 now emerges from the acousto-optic medium 50. The product diffracted beam 68 contains the product of $S_1$ with $S_2$.

Figure 3:
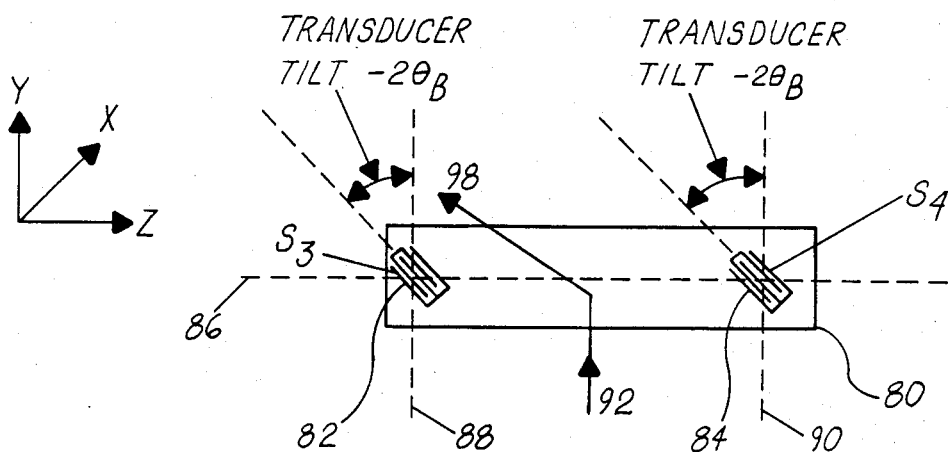
FIG. 3 illustrates an acousto-optic medium with two acoustic transducers disposed thereon.

Referring now to FIG. 3, there is shown an acousto-optic medium 80 with two acoustic transducers 82 and 84 disposed thereon. The acoustic transducer 82 is tilted with respect to the axis 88 by an angle $-2\theta_B$, where $\theta_B$ is the Bragg angle in the acousto-optic medium. The acousto-optic transducer 84 is tilted with respect to the axis 90 by an angle $-2\theta_B$, where $\theta_B$ is the Bragg angle in the acousto-optic medium. In the drawing, axis 86 represents the z-axis and axes 88 and 90 represent the x-axis. The signal $S_3$ is supplied to the acoustic transducer 82 causing the signal to propagate towards the opposite end of the medium. The signal $S_4$ is supplied to acoustic transducer 84 causing the signal to propagate towards the opposite end of the medium. Product diffracted beam 98 diffracted from incoming sheet beam 62 now emerges from the acousto-optic medium 80. The product diffracted beam 98 contains the product of $S_3$ with $S_4$.

Figure 4:
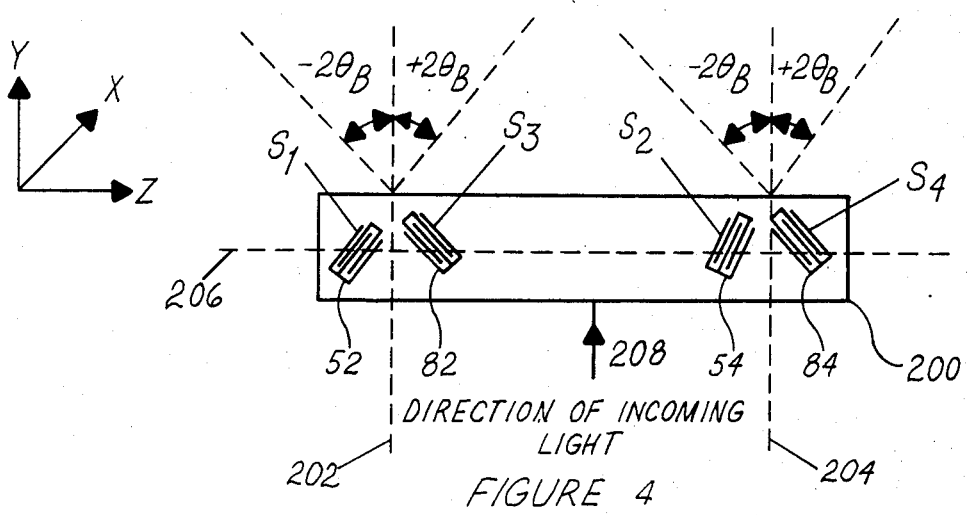
FIG. 4 illustrates an acousto-optic medium with four acoustic transducers disposed thereon.

Acoustic transducers 52, 54, 82, and 84 may be placed on a single acousto-optic medium 200, as shown in FIG. 4. Transducers 52 and 54 are tilted with respect to axes 202 and 204 by an angle $+2\theta_B$, where $\theta_B$ is the Bragg angle in the acousto-optic medium. Transducers 82 and 84 are tilted with respect to axes 202 and 204 by an angle $-2\theta_B$, where $\theta_B$ is is the Bragg angle in the acousto-optic medium. In the drawing, axis 206 represents the z-axis, and axes 202 and 204 represent the x-axis. Signals $S_1$ and $S_3$ are supplied acoustic transducers 52 and 82, respectively, causing the signals to propagate towards the opposite end of the beam. Signals $S_2$ and $S_4$ are supplied to acoustic transducers 54 and 84, respectively, causing the signals to propagate towards the opposite end medium. Signals $S_1$ and $S_2$ cause a diffraction of the incoming sheet beam 208 to produce a first product diffracted beam. Signals $S_3$ and $S_4$ cause a diffraction of the incoming sheet beam 208 to produce a second product diffracted beam. The first product diffracted beam contains a product of $S_1$ with $S_2$, and the second product diffracted beam contains a product of $S_3$ with $S_4$.

While the invention has been described to make reference to the accompanying drawings, we do not wish to be limited to details shown therein as obvious modifications may be made one of ordinary skill in the art.

We claim:

1. An acousto-optic apparatus for providing the products of a first signal with a second signal, and a third signal with a fourth signal, comprising:
   a. means for producing a laser light beam;
   b. means for expanding said laser light beam;
   c. means for forming said expanded laser light beam into a sheet beam;
   d. an acousto-optic medium having an axis and a planar surface extending between opposite first and second ends, said medium is disposed in the path of said sheet beam such that the sheet beam traverses the medium between the medium ends along and parallel to the medium surface;
   e. a first acoustic transducer, disposed at the first end of the acousto-optic medium and supplied with a first signal, for propagating the first signal on the medium surface in the direction of the second end of the acousto-optic medium;
   f. a second acoustic transducer, disposed at the second end of the acousto-optic medium and supplied with a second signal, for propagating the second signal on the medium surface in the direction of the first end of the acousto-optic;

g. a third acoustic transducer, disposed at the first end of the acousto-optic medium and supplied with a third signal for propagating the third signal on the medium surface in the direction of the second end of the acousto-optic medium;

h. a fourth acoustic transducer, disposed at the second end of the acousto-optic medium and supplied with a fourth signal, for propagating the fourth signal on the medium surface in the direction of the first end of the acousto-optic medium;

i. wherein said first and second signals diffract said sheet beam to produce a first beam containing the product of said first signal with said second signal; and j. wherein said third and fourth signals diffract said sheet beam to produce a second beam containing the product of said third signal with said fourth signal.

2. The device of claim 1, wherein:

a. said axis defines the z-axis, the axis normal to said surface defines the y-axis, and the axis normal to both the z-axis and the y-axis defines the x-axis;

b. said first acoustic transducer is disposed at an angle relative to the x-axis of the acousto-optic medium which is equal to $+2\theta_B$, where $\theta_B$ is the Bragg angle for the average of the first and second signal frequencies in the acousto-optic medium;

c. said second acoustic transducer is disposed at an angle relative to the x-axis of the acousto-optic medium which is equal to $+2\theta_B$, where $\theta_B$ is the Bragg angle for the average of the first and second signal frequencies in the acousto-optic medium;

d. said third acoustic transducer is disposed at an angle relative to the x-axis of the acousto-optic medium which is equal to $-2\theta_B$, where $\theta_B$ is the Bragg angle for the average of the third and fourth signal frequencies in the acousto-optic medium; and e. said fourth acoustic transducer is disposed at an angle relative to the x-axis of the acousto-optic medium which is equal to $-2\theta_B$, where $\theta_B$ is the Bragg angle for the average of the third and fourth signal frequencies in the acousto-optic medium.

3. The device of claim 1, wherein the acousto-optic medium comprises a surface acoustic wave device built on Y-Z lithium niobate.

4. A method for providing the products of a first signal with a second signal and a third signal with a fourth signal, comprising the steps of:

a. expanding a laser light beam;

b. forming the expanded beam into a sheet beam;

c. directing said sheet beam to an acousto-optic medium having an axis and a planar surface extending so that the sheet beam traverses the medium between the medium ends along and parallel to the medium;

d. propagating a first signal on the planar surface of the acousto-optic medium toward the second end of the acousto-optic medium;

e. propagating a second signal on the planar surface of the acousto-optic medium toward the first end of the acousto-optic medium;

f. propagating a third signal on the planar surface of the acousto-optic medium toward the second end of the acousto-optic medium;

g. propagating a fourth signal on the planar surface of the acousto-optic medium toward the first end of the acousto-optic medium;

h. wherein said first and second signals diffract said sheet beam to produce a first beam containing the product of said first signal with said second signal; and i. wherein said third and fourth signals diffract said sheet beam to produce a second beam containing the product of said third signal with said fourth signal.

5. An acousto-optic apparatus for producing at least two diffracted optical signals from a single, undiffracted optical signal, comprising;

a. means for producing an undiffracted laser light beam;

b. means for expanding said laser light beam;

c. means for forming said expanded laser light beam into a sheet beam;

d. an acousto-optic medium having an axis and a planar surface extending between opposite first and second ends which is disposed in the path of said sheet beam such that the sheet beam traverses the medium ends along and parallel to the medium surface;

e. a first acoustic transducer, disposed at the first end of the acoustic-optic medium and supplied with a first signal, for propagating the first signal on the medium surface in the direction of the second end of the acousto-optic medium;

f. a second acoustic transducer, disposed at the second end of the acousto-optic medium and supplied with a second signal, for progagating the second signal on the medium surface in the direction of the first end of the acousto-optic medium;

g. a third acoustic transducer, disposed at the first end of the acousto-optic medium and supplied with a third signal, for propagating the third signal on the medium surface in the direction of the second end of the acousto-optic medium;

h. a fourth acoustic transducer, disposed at the second end of the acousto-optic medium and supplied with a fourth signal for propagating the fourth signal on the medium surface in the direction of the first end of the acousto-optic medium;

i. said single, undiffracted optical signal comprises said undiffracted laser light beam;

j. wherein said first and second signals diffract said single, undiffracted optical signal to produce a first product diffracted optical signal; and k. wherein said third and fourth signals diffract said single, undiffracted optical signal to produce a second product diffracted optical signal.

6. The device of claim 5, wherein the acousto-optic medium comprises a surface acoustic wave device built on Y-Z lithium niobate.

* * * * *